(12) United States Patent
Kardashov

(10) Patent No.: US 9,699,400 B2
(45) Date of Patent: Jul. 4, 2017

(54) SYSTEMS AND METHODS FOR DYNAMIC DATA MANAGEMENT FOR CAMERA SYSTEMS

(71) Applicant: FLIR Systems, Inc., Wilsonville, OR (US)

(72) Inventor: Vlad Kardashov, Ontario (CA)

(73) Assignee: FLIR SYSTEMS, INC., Wilsonville, OR (US)

( * ) Notice: Subject to any disclaimer, the term of this patent is extended or adjusted under 35 U.S.C. 154(b) by 0 days.

(21) Appl. No.: 14/731,325

(22) Filed: Jun. 4, 2015

(65) Prior Publication Data

US 2015/0358573 A1 Dec. 10, 2015

Related U.S. Application Data

(60) Provisional application No. 62/008,799, filed on Jun. 6, 2014.

(51) Int. Cl.
| | |
|---|---|
| H04N 21/218 | (2011.01) |
| H04N 21/262 | (2011.01) |
| H04N 21/472 | (2011.01) |
| H04N 21/2343 | (2011.01) |
| H04L 29/06 | (2006.01) |
| H04N 5/76 | (2006.01) |
| H04N 5/77 | (2006.01) |

(52) U.S. Cl.
CPC .............. *H04N 5/76* (2013.01); *H04L 65/80* (2013.01); *H04N 5/77* (2013.01); *H04N 21/21805* (2013.01); *H04N 21/234327* (2013.01); *H04N 21/26216* (2013.01); *H04N 21/47202* (2013.01)

(58) Field of Classification Search
None
See application file for complete search history.

(56) References Cited

U.S. PATENT DOCUMENTS

| | | | | |
|---|---|---|---|---|
| 8,276,035 | B1* | 9/2012 | Savarese | H04L 1/0007 714/749 |
| 8,654,771 | B1* | 2/2014 | Singh | H04W 28/0247 370/328 |
| 8,687,086 | B1* | 4/2014 | Campbell | H04N 19/423 348/222.1 |
| 2014/0015964 | A1* | 1/2014 | Chew | H04N 5/232 348/143 |
| 2014/0086073 | A1* | 3/2014 | Baykal | H04L 41/5038 370/252 |

* cited by examiner

*Primary Examiner* — Mark T Monk
(74) *Attorney, Agent, or Firm* — Haynes and Boone, LLP

(57) ABSTRACT

Techniques are disclosed for systems and methods to provide dynamic data management for a system having one or more cameras such as network cameras. A camera system may include one or more network cameras and a remote device. The remote device may receive camera data from one or more of the network cameras according to data management settings for the camera system. The data management settings may be determined by the system based on an available bandwidth determined based on an exchange of test data between the camera and the remote device. The data management settings can be determined during setup of one or more network cameras and/or during operation of one or more network cameras. The data management settings may include settings for video data to be transmitted over the network such as a resolution, a frame rate, a number of video channels, or other settings.

20 Claims, 7 Drawing Sheets

SYSTEMS AND METHODS FOR DYNAMIC DATA MANAGEMENT FOR CAMERA SYSTEMS

CROSS-REFERENCE TO RELATED APPLICATIONS

This application claims the benefit of and priority to U.S. Provisional Patent Application No. 62/008,799 filed Jun. 6, 2014 and entitled "SYSTEMS AND METHODS FOR DYNAMIC DATA MANAGEMENT FOR CAMERA SYSTEMS" which is hereby incorporated by reference in its entirety.

TECHNICAL FIELD

One or more embodiments of the invention relate generally to camera systems and more particularly, for example, to systems and methods for data management for systems having network cameras.

BACKGROUND

Network cameras have been developed that can record video to a remote storage location such as cloud-based storage. In a typical configuration, a network camera is connected to the internet via a local network device such as a modem and/or a router. The local network device facilitates uploading and downloading of information to and from remote locations via the internet at up to a maximum upload and download data rate. The maximum upload and download data rates typically depend on the type of internet service purchased by the camera owner or user and can also vary depending on the network infrastructure, data usage of the user, computing equipment of the user or other factors.

In order to ensure that, when connected to a network through a user's network connection, sufficient bandwidth is available for uploading video data without interrupting a user's other network usage, conventional network cameras and related systems typically set cloud-based recording to, for example, one or two video channels and a maximum upload data rate of 512 kilobits per second (kpbs) or 1 megabit per second (Mbps), which, for example, may be listed in a user manual or quick start guide for the camera. However, this type of arrangement can unnecessarily limit the capabilities of a network camera that is connected to more robust bandwidth connection, can undesirably affect other network usage for a network camera that is connected to a relatively low bandwidth connection, and cannot respond to changes in the available bandwidth.

There is therefore a need in the art for improved systems and methods for data management for network cameras.

SUMMARY

Techniques are disclosed for systems and methods to provide data management such as dynamic channel allocation for one or more network cameras in accordance with one or more embodiments.

According to an embodiment, a network camera is provided that includes at least one imaging sensor that captures image data and communications circuitry that exchanges test data with a remote device over a network and provides camera data including at least some of the image data to the remote device over the network using data management settings that are based on an available bandwidth determined in response to the exchange of the test data.

According to an embodiment, a system is disclosed that includes a network camera communicatively coupled to a network and a remote device in communication with the network camera over the network, in which the network camera is configured to exchange test data with the remote device over the network to determine an available bandwidth, and the remote device is configured to receive camera data from the network camera based on the determined available bandwidth.

According to various embodiments, the remote device may be a cloud computing system configured to store video data from the network camera, a user device configured to receive video data from the network camera, or a digital video recorder or a network video recorder configured to store video data from the network camera.

According to an embodiment, the camera data from the network camera may have a resolution and a frame rate that are determined based on the available bandwidth. The system may include one or more additional network cameras communicatively coupled to the network and the remote device may receive additional camera data from the additional network cameras based on the available bandwidth.

According to an embodiment, the remote device is configured to receive the camera data and the additional camera data based on the available bandwidth, a fraction of the available bandwidth that is to be used for camera operations, camera system properties associated with the network camera and the additional network camera, and user data preferences of a user of the network camera and the additional network camera.

According to an embodiment, the system includes a user device communicatively coupled to the network, where the user device provides a user with one or more data management options for managing transmission of the camera data from the network camera to the remote device, and where the one or more data management options depend on the available bandwidth. According to various embodiments, the network camera may exchange the test data with the remote device during setup operations for the network camera and/or periodically during operation of the network camera.

According to an embodiment, a method is disclosed that includes sending test data from at least one network camera to a remote device, receiving the test data at the at least one network camera from the remote device, determining an available bandwidth based on the sending and the receiving, determining a fraction of the available bandwidth to be used for camera operations for the at least one network camera, determining data management settings for managing video data from the at least one network camera that are based at least in part on the determining of the available bandwidth and the fraction of the available bandwidth, and providing the video data from the at least one network camera to the remote device according to the data management settings.

According to an embodiment, a method of configuring a camera system having at least one network camera is disclosed that includes exchanging test data between the at least one network camera and a remote device, determining an available bandwidth based on the exchanging, determining a fraction of the available bandwidth to be used for camera operations for the network camera, determining data management settings for the system that are based at least in part on the determining of the available bandwidth and the fraction of the available bandwidth, and managing data for the camera system according to data management settings. According to an embodiment, the managing includes providing video data from the at least one network camera to a remote device according to the data management settings.

According to an embodiment, the determining of the data management settings includes determining camera system properties associated with the at least one network camera, determining user preferences of a user of the at least one network camera, providing data management options to the user, where each of the data management options includes a package of available data management settings determined based on the available bandwidth, the fraction of the available bandwidth, the camera system properties, and the user preferences, and receiving, from the user, a selected one of the data management options containing the data management settings.

According to an embodiment, a method is disclosed that includes providing video data having a resolution from a network camera to a remote device using a number of channels at a frame rate, determining a change in an available bandwidth for the providing while providing the video data, and changing the resolution, the number of channels, and/or the frame rate responsive to the determining of the change.

According to an embodiment, a method of dynamically managing data for a camera system is disclosed that includes managing data for the camera system according to data management settings for the camera system, determining a change in an available bandwidth for managing the data while managing the data, and updating the data management settings for the camera system responsive to the determining of the change.

According to an embodiment, the managing of the data for the camera system includes transmitting camera data from one or more network cameras to a remote storage device over a network, and where the data management settings include settings for an amount and a quality of the video data. The amount may correspond to a number of channels. The quality may correspond to a resolution and/or a frame rate.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the invention and their advantages are best understood by referring to the detailed description that follows. It should be appreciated that like reference numerals are used to identify like elements illustrated in one or more of the figures.

DETAILED DESCRIPTION

In accordance with various embodiments of the present disclosure, systems having cameras such as network cameras are provided. A system may, for example, be a monitoring system having one or more network-connected cameras that are accessible over a network from one or more user devices. Systems and methods may be provided for dynamic data management for camera systems. One or more speed tests may be performed to determine a network speed for the system and system equipment and/or parameters may be set based on the results of the speed test.

Figure 1:
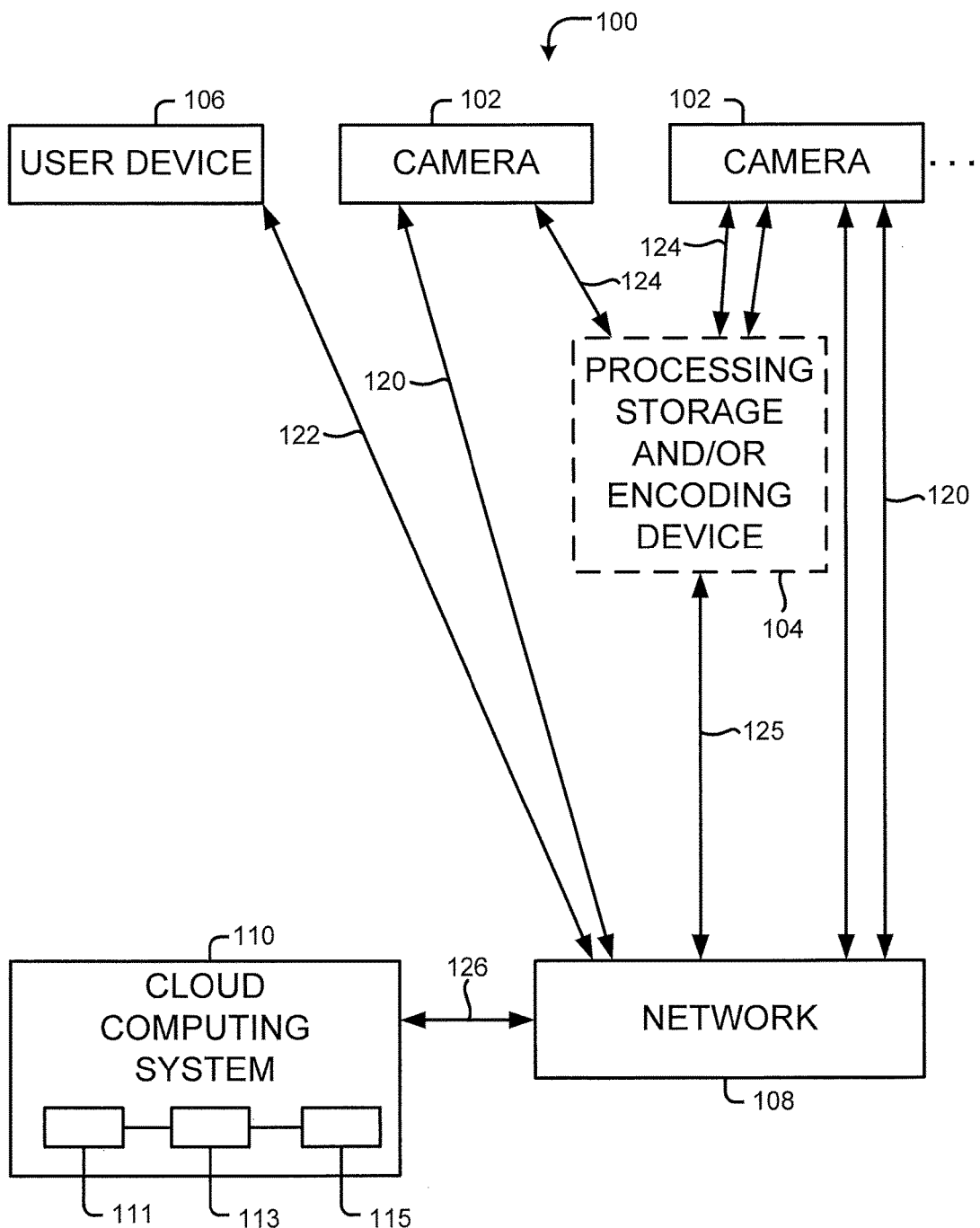
FIG. 1 is an illustrative diagram of a system having one or more network cameras and remote storage in accordance with an embodiment of the disclosure.

FIG. 1 illustrates a block diagram of a system 100 having cameras in accordance with an embodiment of the disclosure. In the embodiment shown in FIG. 1, system 100 includes a plurality of cameras 102 connected to a network 108. Network 108 may be a local network such as a wireless local area network (WLAN) or a relatively wider area network such as the Internet. As shown in FIG. 1, cameras 102 may communicate with one or more other devices such as a user device 106, a processing storage and/or encoding device 104 (e.g., a multi-channel video device such as an network video recorder or a digital video recorder), and/or remote computing equipment such as cloud computing system 110. For example, cameras 102 can send and receive data to and from user device 106 via network 108 over wired and/or wireless communications paths 120 and 122. As another example, cameras 102 can send and receive data to and from cloud computing system 110 via network 108 over wired and/or wireless communications paths 122 and 126. As another example, device 104 can provide data such as multi-channel video data to user device 106 and/or cloud computing system 110.

Cloud computing system 110 may include one or more servers and/or one or more databases. According to various embodiments, cloud computing system 110 may be a dedicated server for performing speed-test operations to determine an available bandwidth for cameras 102 and/or device 104 or cloud computing system 110 may be provided with other functionality such as video storage functionality in addition to functionality for performing speed-test operations. In one embodiment, cloud computing system 110 may include a data routing server 111 that controls the flow of data to and from one or more databases 113 that are communicatively coupled to the routing server 111. In some embodiments, cloud computing system 110 may also include one or more processing servers such as application server 115 that perform data processing and/or other software execution operations for system 100 (e.g., video analytics, data compression or encoding, data encryption, or other applications).

Cloud computing system 110 may receive information from cameras 102 and/or user device 106 and may provide information to cameras 102 and/or user device 106 over network 108. For example, images such as video images may be captured by one or more cameras 102 and provided from the camera(s) to cloud computing system 110. Cloud computing system 110 may receive the video images and may store the video images. When a user desires to obtain the stored video images or other information, user device 106 may be used to obtain the video images or other information from cloud computing system 110.

In one embodiment, system 100 may be a monitoring system (e.g., a security system) for a business or a home in which cameras 102 stream video data to cloud computing system 110 for storage. Whenever the user of the security system wishes to review captured video data, the user can access (e.g., download and/or stream) the video data from cloud computing system 110 (e.g., via network 108 over communications paths 122 and 126). However, this is merely illustrative. Cameras 102, system 110, and/or user device 106 may be incorporated into any suitable system for capturing, storing, processing, and/or viewing images.

As shown in FIG. 1, cameras 102 may be connected directly to network 108. However, system 100 may also, or alternatively, include one or more additional devices such as processing, storage and/or encoding device 104. In various embodiments, cameras 102 may be connected to network 108 through processing, storage and/or encoding device 104 (e.g., over wired and/or wireless communications paths 124 and/ 125), may be connected directly to both processing, storage and/or encoding device 104 and network 108 (e.g., over wired and/or wireless communications paths 124 and 120 respectively), may be connected to network 108 over communications paths 120 and free of connections to processing, storage and/or encoding device 104, and/or may be connected to processing, storage and/or encoding device 104 over communications paths 124 and be free of connections to network 108.

Processing, storage and/or encoding device 104 may include one or more processors and one or more memory devices (e.g., volatile and/or non-volatile memory devices such as RAM (Random Access Memory), ROM (Read-Only Memory), EEPROM (Electrically-Erasable Read-Only Memory), flash memory, a disk drive, and/or other types of memory). Processing, storage and/or encoding device 104 may be implemented as a digital video recorder (DVR), a network video recorder (NVR), and/or a device having both DVR and NVR capabilities.

In embodiments in which device 104 is implemented as a DVR, video data from one or more cameras 102 may be received directly from cameras 102, encoded, compressed, processed, and/or stored by device 104. In embodiments in which device 104 is implemented as an NVR, video data from cameras 102 may be encoded, compressed, and/or processed by the camera and received over a network and/or stored by device 104. However, these examples are merely illustrative. One or more channels of data may be received at device 104 and may be stored by device 104 and/or provided in one or more channels to a remote system such as system 110 and/or user device 106. In various embodiments, cameras 102, processing, storage and/or encoding device 104, user device 106, and/or cloud computing system 110 can exchange video data and/or other information and can cooperate to capture, process, encode, encrypt, store, view, or otherwise handle some or all of the video data as desired.

As information (e.g., data such as video data) is exchanged between components of system 100, the rate at which the video data can be provided from one device to another device can be limited by various features of components 102, 104, 106, 108, and/or 110 and/or by bandwidths (e.g., data rate limits) associated with communications paths 120, 122, 124, 125, and/or 126 that cooperate to define the available bandwidth for sending and/or receiving data. Typically, for example, a network service provider will provide access to network 108 (e.g., the internet) with a limited upload bandwidth and a limited download bandwidth based on the level of service purchased from the service provider.

In order to provide a consistent, high quality data stream that does not interfere with other network operations of system 100, cameras 102, user device 106, cloud computing system 110, and/or processing, storage, and/or encoding device 104 may perform data rate and/or bandwidth testing operations during setup of one or more network cameras, NVRs, DVRs, and/or other video devices and/or during normal operation of one or more network connected cameras, DVRs, NVRs, and/or other video devices and may adjust the amount, quality, or other properties or parameters of the data stream based on the testing operations. Any or all of cameras 102, user device 106, cloud computing system 110, and/or processing, storage, and/or encoding device 104 may be used to perform some or all of the speed testing operations that determine an available bandwidth, may be used to determine data management settings such as data transmission parameters for system 100 based at least in part on the determined available bandwidth, and/or may be used to provide video data to another device using the determined data management settings.

Data management settings may include network data parameters such as a number of channels of video data to be transferred between cameras 102, user device 106, processing, storage, and/or encoding device 104, and/or cloud computing system 110, a frame rate of video data that can be transferred, a resolution of video data that can be transferred, an amount of additional data such as video analytics data that can be transferred together with video data to be transferred, and/or services that can be offered together with video data to be transferred.

Each channel of video data may correspond to video data from a corresponding camera, video data from one of multiple video sensors within a camera (e.g., a visible light sensor and an infrared sensor such as a near-infrared sensor, a thermal infrared sensor, or other infrared sensor), combined video data from one or more cameras and/or one or more sensors of a camera, video analytics or summary data (e.g., still images, detected object information, zoomed or enhanced portions of a still image), encoded video data from multiple cameras and/or multiple sensors, other information associated with a camera and/or other video data and/or services data associated with one or more cameras, NVRs, DVRs, and/or other video devices such as multi-channel video data from an NVR or a DVR (as examples).

In some embodiments, data management settings (or options for data management settings) may be determined based on the available bandwidth and additional information such as user preferences, a fraction of the available bandwidth (e.g., a default fraction, user-provided fraction, or dynamically determined fraction) to be used for camera or other video operations, and/or camera system properties such as a number of cameras in the system, a number of sensors in each camera, a desired level of video combination, processing, analytics, and/or services desired, or other system properties.

The available bandwidth can be determined by one or more of cameras 102, by user device 106, by device 104, and/or by cloud computing system 110. The available bandwidth can be determined during setup of system 100 (e.g., during setup of one or more of cameras 102 and/or during setup of one or more processing, storage, and/or encoding devices 104) and can be continuously or periodically determined during operation of system 100. System 100 may determine, during operation of system 100, that the available bandwidth has changed and may automatically adjust data management settings such as a channel allocation in response to the determined change and/or may alert a user of the system to the change and prompt the user to decide whether to change the channel allocation. In this way, data management can by dynamically adjusted at setup and during operation of system 100. The data management settings can be determined, based on the available bandwidth, by one or more of cameras 102, by user device 106, by device 104, and/or by cloud computing system 110.

User device 106 may be a computing device such as a desktop computer or a mobile computing device such as a mobile phone, tablet, personal digital assistant (PDA), laptop computer or other computing device having communications circuitry (e.g., wireless communications circuitry or wired communications circuitry) for connecting with other devices.

Figure 2:
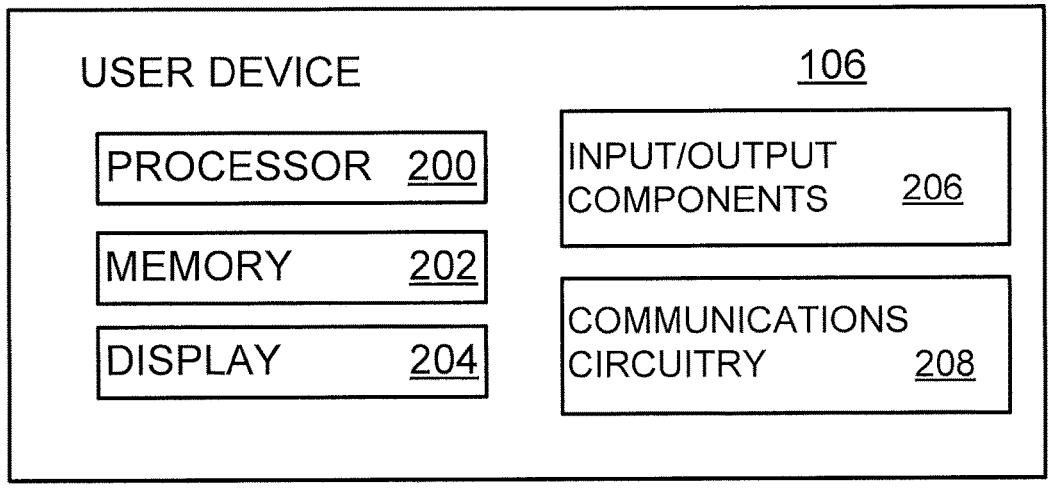
FIG. 2 is a block diagram of an illustrative user device for communicating with a network camera in accordance with an embodiment of the disclosure.

As shown in FIG. 2, according to an embodiment, user device 106 may include components such as processor 200, memory 202, display 204, input/output components 206, and communications circuitry 208. Processor 200 may be implemented as any appropriate processing device (e.g., logic device, microcontroller, processor, application specific integrated circuit (ASIC), or other device) that may be used by user device 106 to execute appropriate instructions, such as software instructions stored in memory 202.

Memory 202 may include one or more memory devices (e.g., memory components) that store data and information, including image data (e.g., including video data), audio data, network information, camera information, account information, and/or other types of sensor data, and/or monitoring information. The memory devices may include various types of memory for information storage including volatile and non-volatile memory devices, such as RAM (Random Access Memory), ROM (Read-Only Memory), EEPROM (Electrically-Erasable Read-Only Memory), flash memory, a disk drive, and other types of memory described herein. In one embodiment, memory 202 may include a portable memory device that can be removed from user device 106 and used to convey stored data to other systems. In some embodiments, processor 200 may be configured to execute software instructions stored on memory 202 to perform various methods, processes, or operations in the manner described herein.

Display 204 may include any suitable user-viewable display for displaying camera information, images such as video images from one or more network cameras and/or remote computing equipment, a camera control interface for controlling a network camera, or other images or information for displaying to a user. For example, display 204 may be a liquid crystal display, a touch-screen display or other type of display. Input/output components 206 may include one or more buttons, indicators (e.g., LEDs), keyboards, trackballs, knobs, joysticks, and/or other type of user interface adapted to accept user input and/or provide user feedback.

Communications circuitry 208 may include circuitry for communicating with other devices using various communications protocols. As examples, communications circuitry that may be included in a user device may include near field communications (NFC) circuitry (e.g., a powered or unpowered NFC integrated circuit that generates, receives, and/or processes communication signals according to radio-frequency identification (RFID) standards such as the ISO/IEC 14443, ISO/IEC 18092 or FeliCa standards), wireless network (WiFi®) circuitry, a modular cellular component that generates, receives, and/or processes communications signals over one or more cellular data networks, wireless communication components that generate, receive, and/or process communications signals based on, for example, the Bluetooth® standard, other appropriate short range wireless communication standards circuitry, a wireless broadband component (e.g., based on WiMax technologies), a wireless satellite component, or other appropriate wireless communication components.

Communications circuitry 208 may also be configured for a proprietary wireless communication protocol and interface based on radio frequency (RF), microwave frequency (MWF), infrared frequency (IRF), and/or other appropriate wireless transmission technologies. Communications circuitry 208 may include one or more antennas for wireless communication purposes. Thus, in one example, communications circuitry 208 may handle, manage, or otherwise facilitate wireless communication by establishing wireless communication links to a wireless router, hub, or other appropriate wireless devices.

Communications circuitry 208 may also be configured to interface with a wired network and/or device via a wired communication component such as an Ethernet interface, a power-line modem, a Digital Subscriber Line (DSL) modem, a Public Switched Telephone Network (PSTN) modem, a cable modem, and/or other appropriate components for wired communication. Proprietary wired communication protocols and interfaces may also be supported by communications circuitry 208. Communications circuitry 208 may be configured to communicate over a wired communication link (e.g., through a network router, switch, hub, or other network devices) for wired communication purposes. For example, a wired link may be implemented with a power-line cable, a coaxial cable, a fiber-optic cable, or other appropriate cables or wires that support corresponding wired network technologies.

Figure 3:
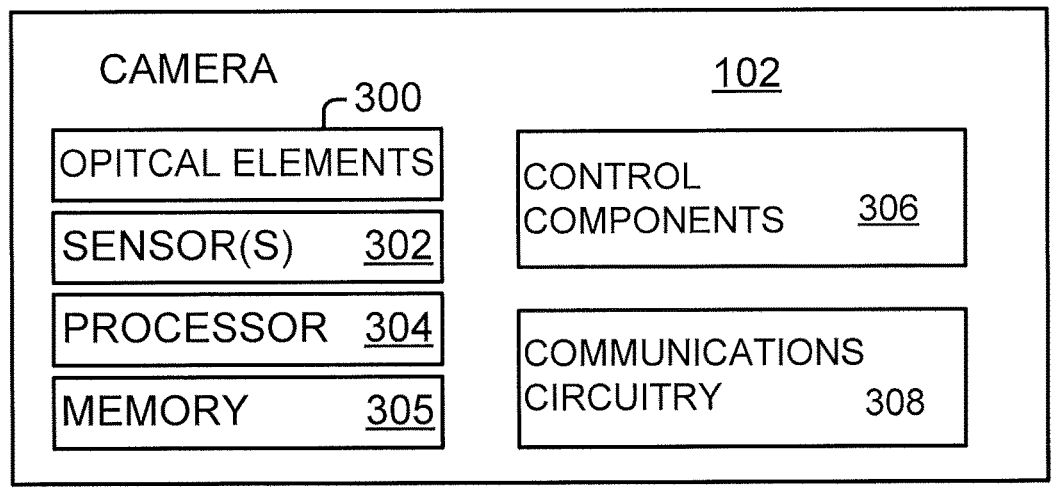
FIG. 3 is a block diagram of an illustrative network camera in accordance with an embodiment of the disclosure.

As shown in FIG. 3, according to an embodiment, camera 102 may include components such as imaging components (e.g., optical elements 300 and one or more sensors 302), processor 304, memory 305, control components 306, and communications circuitry 308.

Sensor(s) 302 may include imaging sensors sensitive to light in one or more wavelength bands and/or other sensors (e.g., environmental sensors such as humidity, temperature, location, or other sensors). Imaging sensors may include a visible light sensor, a thermal infrared sensor, a long wavelength infrared (LWIR) sensor, a mid wavelength infrared (MWIR) sensor, a short wavelength infrared (SWIR) sensor, a near infrared (NIR) sensor, and/or one or more hybrid image sensors for capturing images in response to light in multiple different wavelength bands.

Imaging sensors may be arranged to receive light through one or more of optical elements 300. Optical elements 300 may include one or more lenses, filters, films, gratings, prisms, beam splitters, or other suitable optical elements for filtering, focusing, zooming, and/or otherwise blocking, passing, processing, and/or directing light onto one or more of sensors 302.

Processor 304 may be implemented as any appropriate processing device (e.g., logic device, microcontroller, processor, application specific integrated circuit (ASIC), or other device) that may be used by camera 114 to execute appropriate instructions, such as software instructions stored in memory 305.

Memory 305 may include one or more memory devices (e.g., memory components) that store data and information, including image data (e.g., including video data), audio data, network information, camera information, and/or other types of sensor data, and/or other monitoring information. The memory devices may include various types of memory for information storage including volatile and non-volatile memory devices, such as RAM (Random Access Memory), ROM (Read-Only Memory), EEPROM (Electrically-Erasable Read-Only Memory), flash memory, a disk drive, and other types of memory described herein. In one embodiment, memory 305 may include a portable memory device that can be removed from camera 102 and used to convey stored data to other systems. In some embodiments, processor 304 may be configured to execute software instructions stored on memory 305 to perform various methods, processes, or operations in the manner described herein. Control components 306 may include one or more buttons, indicators (e.g., LEDs), keyboards, displays, trackballs, knobs, joysticks, and/or other type of user interface adapted to accept user input and/or provide user feedback.

Communications circuitry 308 may include circuitry for communicating with other devices using various communications protocols. As examples, communications circuitry that may be included in a camera such as a network camera may include near field communications (NFC) circuitry (e.g., a powered or unpowered NFC integrated circuit that generates, receives, and/or processes communication signals according to radio-frequency identification (RFID) standards such as the ISO/IEC 14443, ISO/IEC 18092 or FeliCa standards), wireless network (WiFi®) circuitry, a modular cellular component that generates, receives, and/or processes communications signals over one or more cellular data networks, wireless communication components that generate, receive, and/or process communications signals based on, for example, the Bluetooth® standard, other appropriate short range wireless communication standards circuitry, a wireless broadband component (e.g., based on WiMax technologies), a wireless satellite component, or other appropriate wireless communication components.

Communications circuitry 308 may also be configured for a proprietary wireless communication protocol and interface based on radio frequency (RF), microwave frequency (MWF), infrared frequency (IRF), and/or other appropriate wireless transmission technologies. Communications circuitry 308 may include one or more antennas for wireless communication purposes. Thus, in one example, communications circuitry 308 may handle, manage, or otherwise facilitate wireless communication by establishing wireless communication links to a wireless router, hub, or other appropriate wireless devices.

Communications circuitry 308 may also be configured to interface with a wired network and/or device via a wired communication component such as an Ethernet interface, a power-line modem, a Digital Subscriber Line (DSL) modem, a Public Switched Telephone Network (PSTN) modem, a cable modem, and/or other appropriate components for wired communication. Proprietary wired communication protocols and interfaces may also be supported by communications circuitry 308. Communications circuitry 308 may be configured to communicate over a wired communication link (e.g., through a network router, switch, hub, or other network devices) for wired communication purposes. For example, a wired link may be implemented with a power-line cable, a coaxial cable, a fiber-optic cable, or other appropriate cables or wires that support corresponding wired network technologies.

Figure 4:
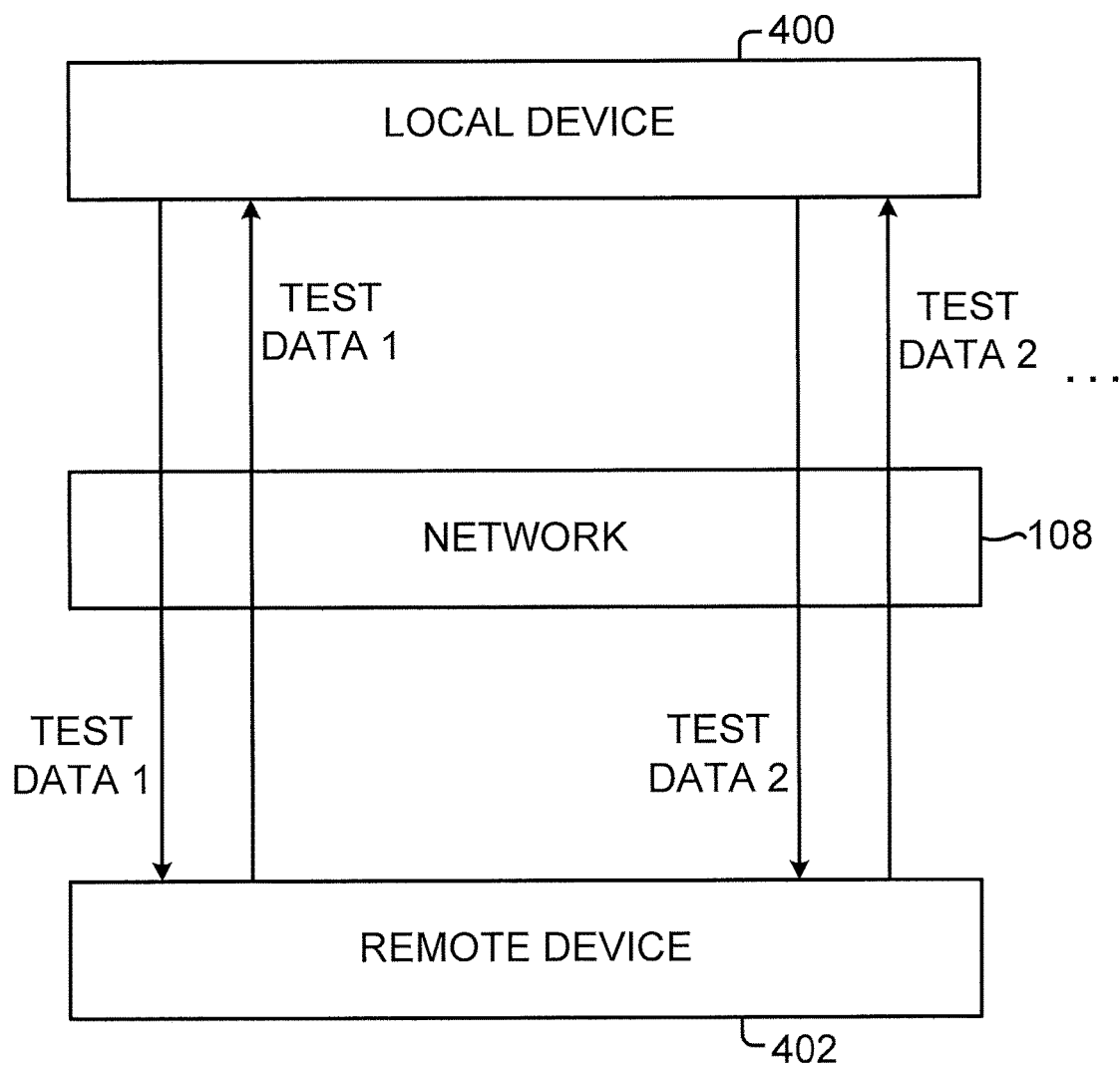
FIG. 4 is an illustrative diagram of a portion of a system showing how test data may be exchanged between a local device and a remote device to determine an available bandwidth in accordance with an embodiment of the disclosure.

FIG. 4 is a diagram of a portion of a system of the type shown in FIG. 1 showing how data may be exchanged between portions of the system during testing operations such as speed test operations for determining data management settings for the system according to an embodiment. Determined data management settings may be used to govern uploading of data from one or more cameras to a remote storage system and/or downloading of data to, for example, a user device from one or more cameras or from a remote storage system.

As shown in FIG. 4, a local device 400 (e.g., a user device, a camera such as a network camera, or a processing, storage and/or encoding device such as an NVR or a DVR) may exchange data with a device such as a remote device 402 (e.g., a cloud computing system, a user device, or a processing, storage, and/or encoding device such as an NVR or a DVR) over a network such as network 108. According to various embodiments, remote device 402 may be a dedicated server for performing speed-test operations to determine an available bandwidth for local device 400 or remote device 402 may be provided with other functionality such as video storage functionality in addition to functionality for performing speed-test operations. For example, local device 400 may represent one of cameras 102, processing, storage, and/or encoding device 104, or user device 106 of FIG. 1 and remote device 402 may represent cloud computing equipment 110 of FIG. 1. However, this is merely illustrative. In one embodiment, local device 400 may be one of cameras 102 and remote device may be user device 106.

In order to determine the available bandwidth for transferring data such as video data between local device 400 and remote device 402 or another remote device, local device 400 may send a first set of data (e.g., TEST DATA 1 in FIG. 4) such as one or more data packets having known size (e.g., 20 megabytes (MB)) to remote device 402 and remote device 402 may return the same data back to local device 400. Local device 400 may determine the time it takes for the first set of data to be transmitted to and/or from remote device 402 and, based on the determined time and the known size of the first set of data, determine an available bandwidth.

In some embodiments, multiple exchanges of data may be made to determine the available bandwidth. For example, a second set of data (e.g., TEST DATA 2 in FIG. 4) may be exchanged by sending the second set of data from local device 400 to remote device 402 and sending the second data from remote device 402 back to local device 400. Local device 400 may determine a second time it takes for the second set of data to be transmitted to and/or from remote device 402 and, based on the determined second time and the known size of the second set of data, along with the determined time and the known size of the first set of data, determine an available bandwidth. In various embodiments, any number of data exchanges may be performed to determine the available bandwidth.

In some embodiments, exchanges of data packets of varying size may be made. For example, TEST DATA 1 may have a size that is different (e.g., larger or smaller) than the size of TEST DATA 2. In various embodiments, test data packets of one size, two sizes, three sizes, four sizes, or more than four sizes may be exchanged.

Testing operations of the type described above in connection with FIG. 4 may be performed, for example, during setup operations for a network camera or a DVR or NVR device. For example, setup operations for a network camera may include registration operations, user demonstration operations, hardware setup operations, or other operations for initially connecting a network camera to a network, providing access to video data from the network camera by one or more user devices, and/or configuring remote storage for storing and providing access to video data from the network camera. In some embodiments, available bandwidth determination operations can be performed as a background operation that is not readily visible to a user during the setup operations. Testing operations for determining the available bandwidth (e.g., operations controlling sending, receiving, and processing of test data) may be handled all or in part by either or both of local device 400 and/or remote device 402.

Figure 5:
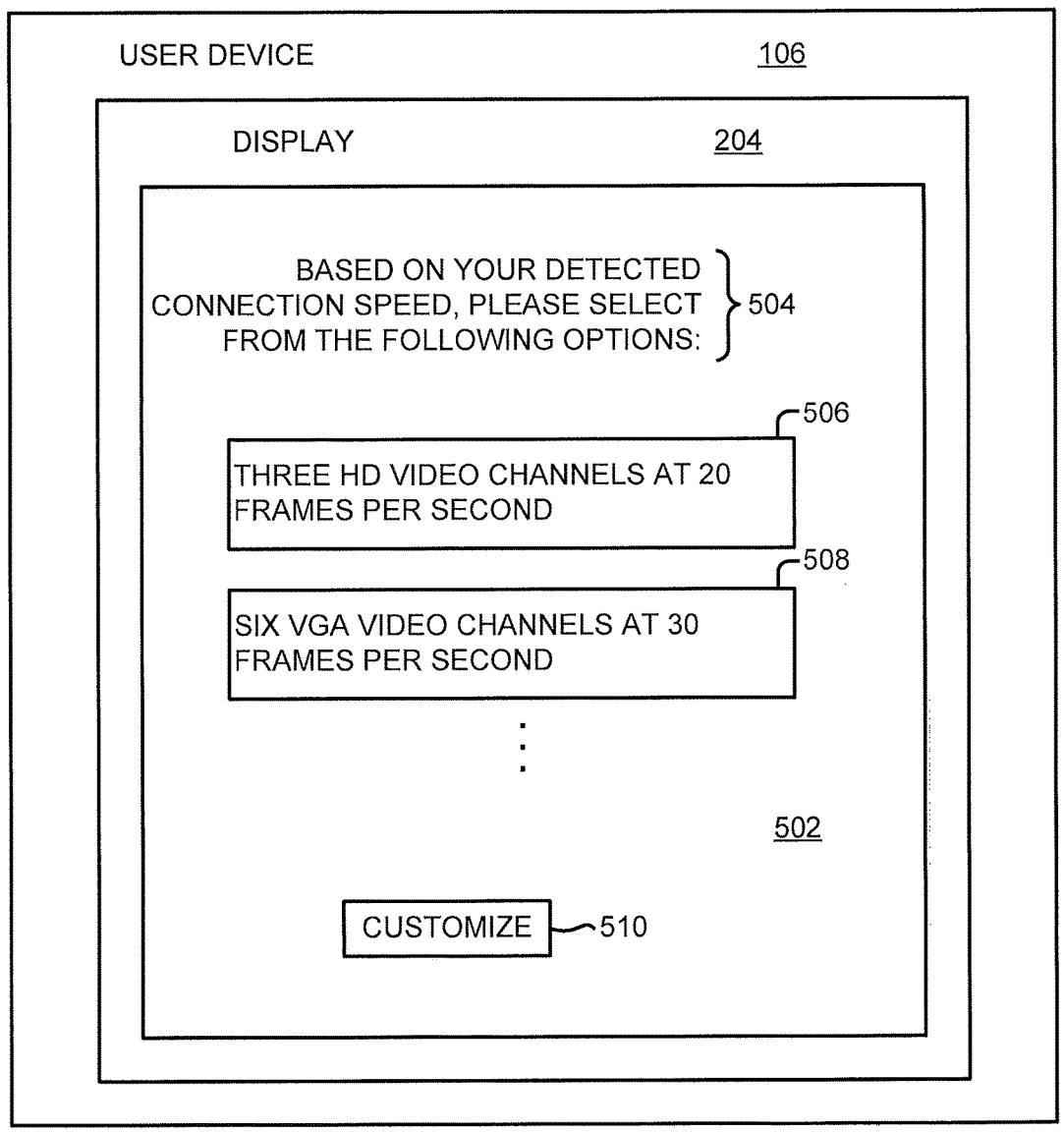
FIG. 5 is a diagram of an illustrative user device having a display showing how data management options may be provided to a user using the display based on a detected network connection speed in accordance with an embodiment of the disclosure.

Once an available bandwidth has been determined, based on the available bandwidth and, if desired, other information as described herein, a user may be provided with one or more packages of data management settings from which to select. The packages of data management settings may be offered to the user as options for allocation of some or all of the available bandwidth for camera operations. FIG. 5 shows examples of data management options that may be offered to a user according to an embodiment. In the example of FIG. 5, data management options are provided to the user using a display of a user device.

As shown in FIG. 5, display 204 of user device 106 may be used to provide data management options to a user. For example, a dedicated application running on user device 106 may use display 204 to display text, images, selectable options, or other information to the user an application window 502. According to an embodiment, a user may be provided with text 504 (e.g., text such as "BASED ON YOUR DETECTED CONNECTION SPEED, PLEASE SELECT FROM THE FOLLOWING OPTIONS:") that prompts the user to select from one or more data management options such as options 506 and 508 based on an available bandwidth (connection speed). Data management option 506 may include text describing data management settings such as data transmission parameters associated with that option (e.g., "THREE HD VIDEO CHANNELS AT 20 FRAMES PER SECOND") and data management option 508 may include text describing data management settings such as data transmission parameters associated with that option (e.g., "SIX VGA VIDEO CHANNELS AT 30 FRAMES PER SECOND").

As shown, each data management option may include a package of data management settings such as a number of video channels, a resolution such as high-definition (HD) resolution (e.g., 1920 pixels by 1080 pixels or 1440 pixels by 1080 pixels of progressive or interlaced data per frame) or video graphics array (VGA) resolution (e.g., 640 pixels by 480 pixels of data per frame) or other resolutions, and a frame rate (e.g., 20 frames per second, 30 frames per second, etc.). However, this is merely illustrative. Data management options 506 and/or 508 and/or other data management options may include any data management settings as described herein that can be accommodated within the available bandwidth (or a particular fraction of the bandwidth). Options 506 and 508 and/or other options may be presented to the user in a selectable manner (e.g., in a pull down list, in a selectable area of display 204, or along with a virtual or real button for selecting the option) as would be understood by one skilled in the art.

In some embodiments, a user may be provided with a mechanism for customizing data management settings by generating a custom package of data management settings from various data transmission parameters subject to the determined bandwidth limits. For example, the user may be provided with a virtual customization (e.g., "CUSTOMIZE") button 510 that, when selected, causes user device 106 to provide the user with the ability to assemble a customized data management package by selecting from various individual data management settings (e.g., number of channels, resolution, frame rate, level of analytics and/or metadata, offering of services, etc.).

Figure 6:
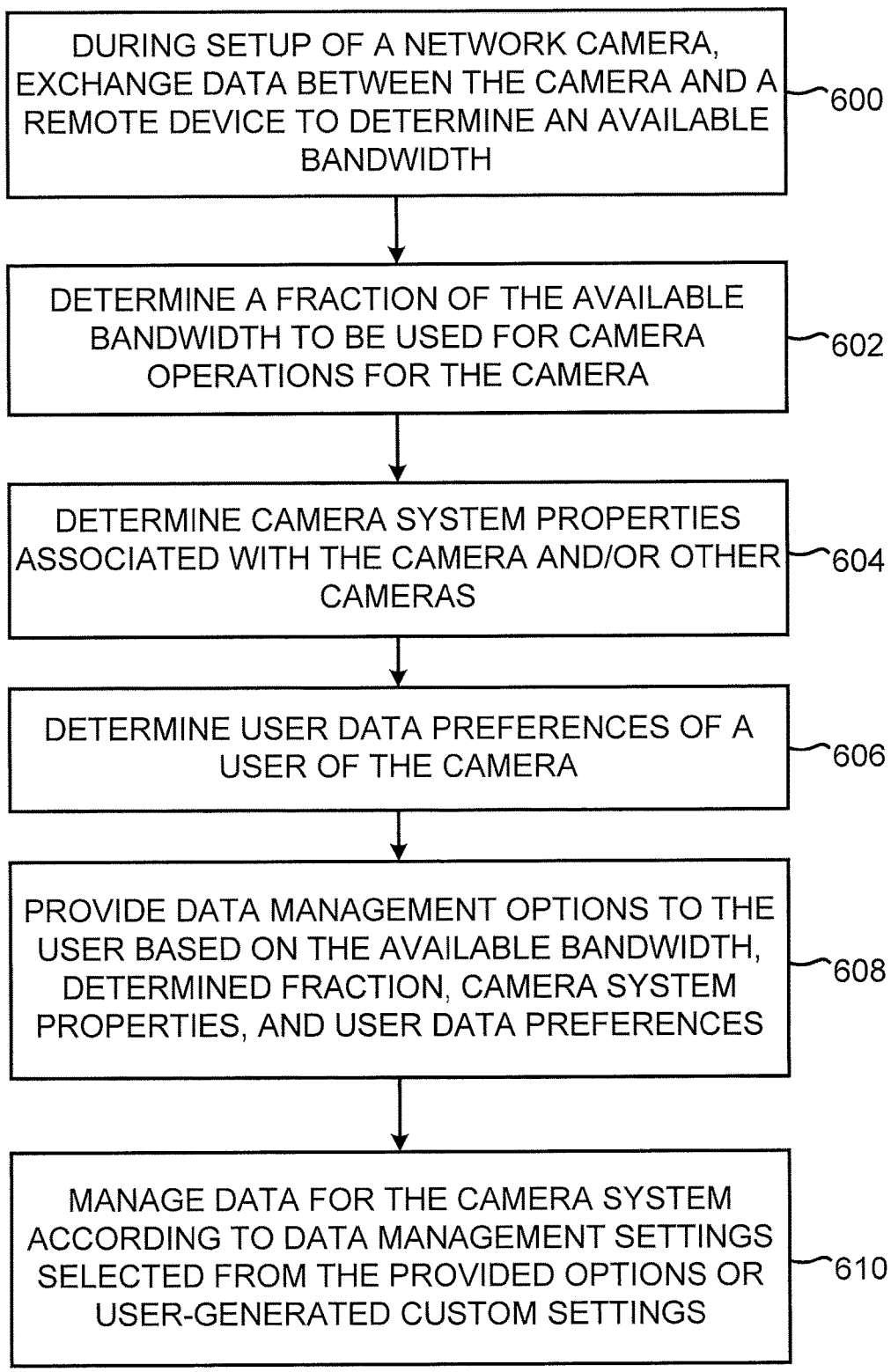
FIG. 6 is a flow chart of illustrative operations that may be performed for data management setup for one or more network cameras in accordance with an embodiment of the disclosure.

Illustrative operations that may be performed for dynamically managing data for a system having one or more network cameras are shown in FIG. 6 according to an embodiment.

At block 600, data may be exchanged between a camera such as a network-connected camera and a remote device such as a remote server, a user device, and/or a processing, storage, and/or encoding device to determine an available bandwidth. The data may be exchanged between the camera and the remote device during setup operations for the camera. The data may be exchanged, for example, as described above in connection with FIG. 4.

At block 602, a fraction or a portion (e.g., a percentage) of the available bandwidth that is to be used for camera operations (e.g., transmitting data from one or more cameras to a cloud computing system, a DVR or NVR, and/or to a user device) may be determined. The fraction of the available bandwidth may be determined by obtaining a default portion (e.g., seventy percent, sixty percent, eighty percent, etc.) from programmed hardware, by receiving a user-selected fraction of the available bandwidth, or by determining a non-camera-related usage of the available bandwidth and determining the fraction of the available bandwidth to be a remaining portion of the available bandwidth not being utilized by the non-camera-related usage (as examples).

At block 604, camera system properties associated with the camera and/or other cameras may be determined. For example, the number of cameras in the system, the number of sensors in each camera, NVR properties, DVR properties, cloud system properties, user account privileges (e.g., based on a user network subscription or camera services subscription at a given service level) or other properties of the camera system may be determined.

At block 606, one or more user data preferences of a user of the camera may be determined. User data preferences may include video analytics preferences, resolution preferences, frame rate preferences, camera preferences, or other video data preferences of the user.

At block 608, one or more options for data management such as packages of data management settings to be used for remote recording of video may be determined based on the available bandwidth, the determined fraction, the camera system properties, and/or the user data preferences. Each option for data management may include a number of data channels, a frame rate, and a resolution setting of the type described above in connection with FIG. 5 and/or other data management settings. For example, options for a camera system with two cameras may include higher resolution setting options than options for a camera system with eight cameras and the same or similar available bandwidth. As another example, a particular user may prefer high resolution video frames to high frame rate video images or may prefer more video channels to high resolution video frames. Data management options for the user may be determined based on these or other user preferences in addition to the available bandwidth, the available fraction of the available bandwidth, and/or the camera system properties.

At block 610, data such as video data for the camera system may be managed according to data management settings selected from the provided options or according to user-generated custom data management settings generated by a user based on the available bandwidth. Managing video data for the camera system may include recording video at a remote storage location according to the data management settings. For example, if a user were to choose option 506 of FIG. 5 (e.g., by selecting option 506 using display 204 or another selection mechanism), three channels of high-definition video may be provided to cloud computing system 110 from cameras 102 of FIG. 1 and stored by the cloud computing system for real-time or later access by user device 106.

Figure 7:
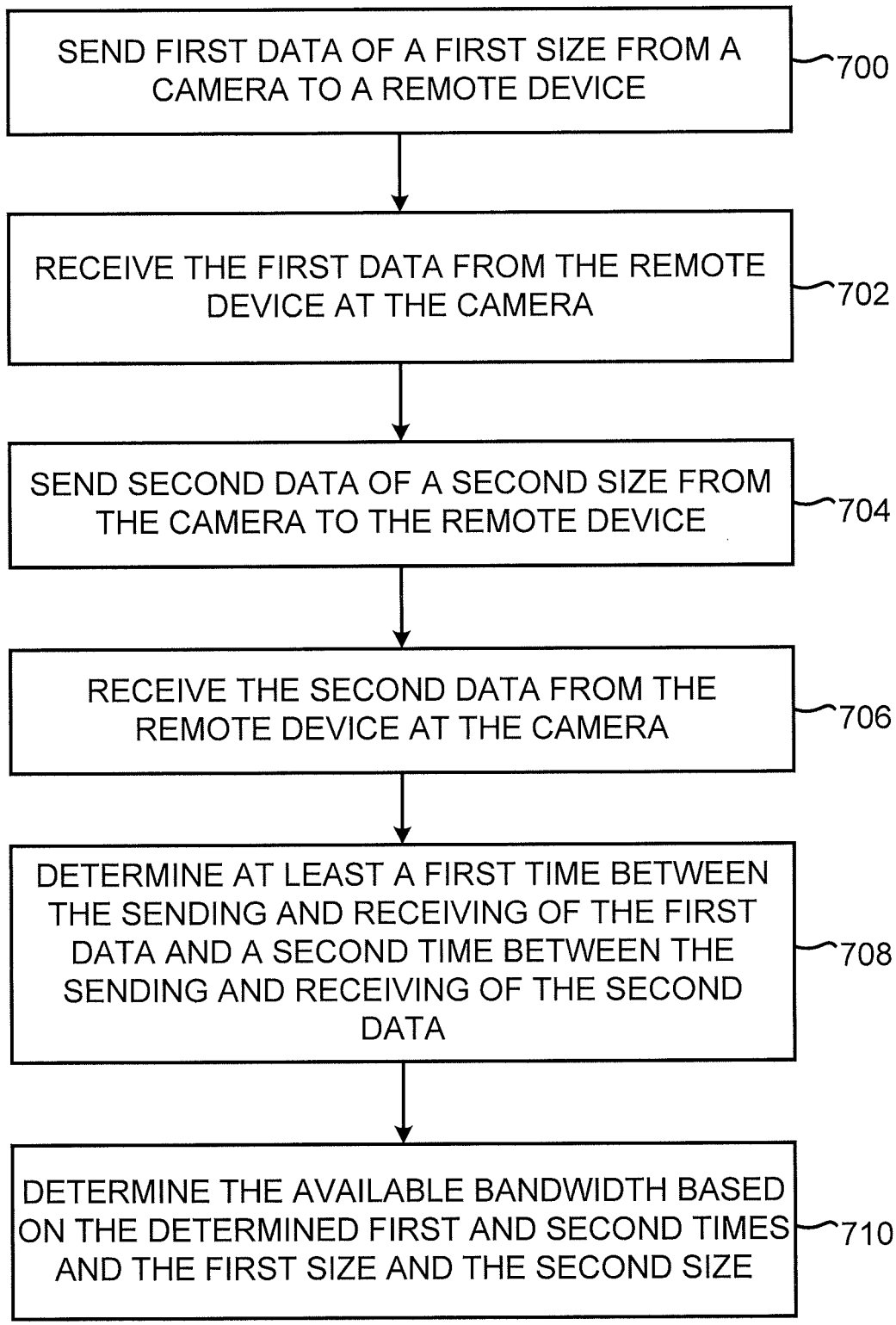
FIG. 7 is a flow chart of illustrative operations that may be performed for determining an available bandwidth for a network camera in accordance with an embodiment of the disclosure.

Illustrative operations that may be performed for determining the available bandwidth, for example, at block 600 of FIG. 6 are shown in FIG. 7.

At block 700, a first data may be provided (e.g., sent) from a camera to a remote device such as a cloud based server, a user device, and/or a processing, storage, and/or encoding device. The first data may have a first size (e.g., between 1 MB and 50 MB, between 10 MB and 30 MB, or other suitable number of bytes).

At block 702, the first data may be received at the camera from the remote device. For example, the remote device may receive the first data and send the first data (or a copy of the first data) back to the camera.

At block 704, a second data may be provided (e.g., sent) from the camera to the remote device. The second data may have a second size that is the same as, smaller than, or larger than the first size.

At block 706, the second data may be received at the camera from the remote device. For example, the remote device may receive the second data and send the second data (or a copy of the second data) back to the camera.

At block 708, a first time between the sending and receiving of the first data by the camera and a second time between the sending and receiving of the second data by the camera may be determined.

At block 710, the available bandwidth may be determined based on the determined first and second times and the first and second sizes as would be understood by one skilled in the art. However, this is merely illustrative. In various embodiments, other times may be determined and used to determine the available bandwidth (e.g., the time for the first data to reach the remote device from the camera, the time for the second data to reach the remote device from the camera, or other times associated with the exchange of test data between the camera and the remote device), more than two sets of test data may be exchanged, and/or other operations associated with measuring bandwidth for communications between devices as would be understood by one skilled in the art may be used.

In various embodiments, the operations described above in connection with blocks 700-710 may be combined, reordered, repeated and/or omitted, as desired or other suitable operations for determining a network connection speed and/or bandwidth may be performed as desired to determine the available bandwidth.

Figure 8:
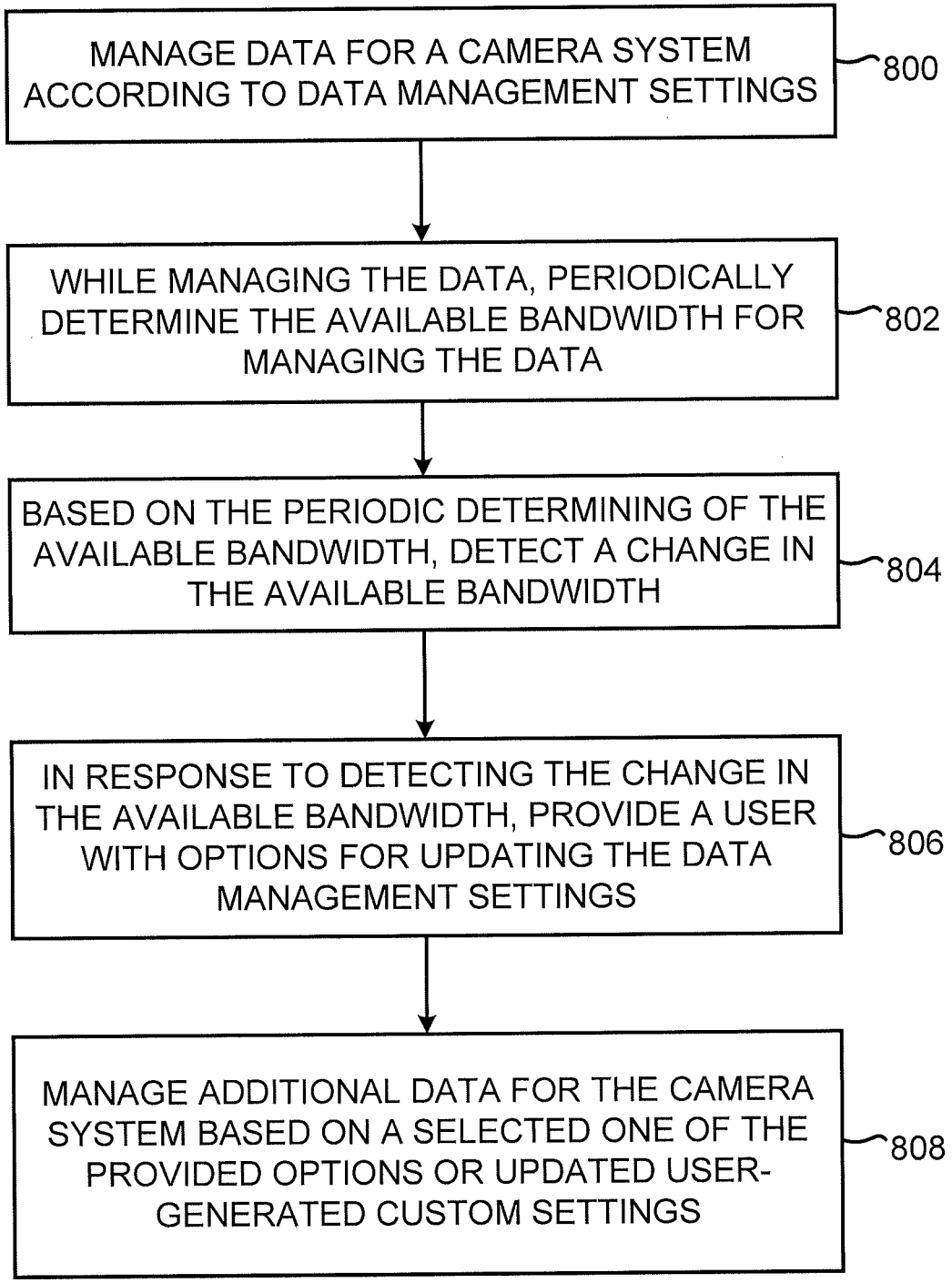
FIG. 8 is a flow chart of illustrative operations that may be performed for dynamic data management for one or more network cameras in accordance with an embodiment of the disclosure.

As described herein, during operation of a system such as system 100 of FIG. 1, the data management settings of the system may be dynamically adjusted responsive to changes in system properties and/or changes in network usage and/or available bandwidth as determined by the system during operation. FIG. 8 is a flowchart of illustrative operations that may be performed for dynamically adjusting the data management settings of a system having network cameras according to an embodiment.

At block 800, data such as video data for the camera system may be managed according to data management settings for the camera system. The data management settings may be settings based on a selected one of a plurality of provided options such as data management options that have been provided to a user or based on user-generated custom data management settings as described above in connection with, for example, block 610 of FIG. 6. Managing the data may include providing a number of channels of video data and, if desired, additional data such as analytics data or meta data to a storage and/or viewing device from a camera and/or an associated storage device as determined by the data management settings.

At block 802, while managing the data according to the data management settings, the available bandwidth for sending and/or receiving data from one or more cameras in the camera system may be determined. Determining the available bandwidth while managing the data may include sending packets of test data between one or more cameras and one or more remote devices, sending packets of test data between cameras, and/or monitoring the time it takes for system data such as video data to be sent and received by system components.

At block 804, based on the periodic determining of the available bandwidth, one or more changes in the available bandwidth may be detected. Detecting changes in the available bandwidth may include comparing a current available bandwidth to one or more previously determined available bandwidths or to an average of previously determined available bandwidths, comparing available bandwidths determined at various times (e.g., times of day, times during a week, times during a month, etc.) and/or may include computing an average current available bandwidth and comparing the computed average with a previous available bandwidth, a previous computed average or a threshold (as examples).

Periodically determining the available bandwidth may include determining a current available bandwidth periodically (e.g., every day, every week, every month, every year, every hour, every 10 minutes, every 1 minute, every 30 seconds, or any other time period). The periodicity with which the available bandwidth is determined may be constant or may be variable. In one embodiment, the periodicity may be dynamically adjusted based on a determined variability in the available bandwidth or other system property as measured by the system during operation of the system.

At block 806, in response to detecting the change in the available bandwidth, a user may be provided with options for updating the data management settings. For example, responsive to detecting a reduction in the available bandwidth, a camera, NVR, DVR, user device or other system component may generate options for data management settings that include a reduced number of video channels, a reduced resolution, a reduced frame rate, reduced meta data, reduced video analytics data, etc. In another example, responsive to detecting an increase in the available bandwidth, a camera, NVR, DVR, user device or other system component may generate options for data management settings that include an increased number of video channels, an increased resolution, an increased frame rate, increased meta data, increased video analytics data, etc.

The operations described above in connection with block 806 are merely illustrative. In some embodiments, updated data management settings may be automatically determined in response to detecting the change in available bandwidth. For example, responsive to detecting a reduction in the available bandwidth, a camera, NVR, DVR, user device or other system component may automatically generate updated data management settings that include a reduced number of video channels, a reduced resolution, a reduced frame rate, reduced meta data, reduced video analytics data, etc. In another example, responsive to detecting an increase in the available bandwidth, a camera, NVR, DVR, user device or other system component may automatically generate updated data management settings that include an increased number of video channels, an increased resolution, an increased frame rate, increased meta data, increased video analytics data, etc.

At block 808, additional data such as additional video data for the camera system may be managed according to updated data management settings based on the change in the available bandwidth. Managing the additional data according to the updated data management settings may include providing video data from a camera, NVR, DVR, or other device at the increased or decreased number of video channels, resolution, frame rate, meta data rate, video analytics data rate, etc. Managing the additional data according the updated data management settings may also include, for example, determining particularly busy times (e.g., times during which bandwidth is occupied by other devices of a user running on the same network) in a specific environment and, during this busy time, reducing the bandwidth consumption of one or more video components to avoid disrupting operation of the other devices. As another example, low bandwidth usage times (e.g., times during which bandwidth is not heavily used by other devices of a user running on the same network) can also be identified and, bandwidth heavy system operations can be performed during the low bandwidth usage times (e.g., to push a firmware update to a camera or other video device) in order to quickly and efficiently perform these operations without interrupting other network operations for the user.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A network camera comprising:
   at least one imaging sensor configured to capture image data; and
   communications circuitry configured to:
      exchange test data with a remote device over a network, and
      provide camera data including at least some of the image data to the remote device over the network using data management settings that are based on an available bandwidth determined in response to the exchange of the test data, a fraction of the available bandwidth that is to be used for camera operations, camera system properties associated with the network camera, and user data preferences of a user of the network camera.

2. The network camera of claim 1, wherein the remote device comprises a cloud computing system configured to store video data from the network camera.

3. The network camera of claim 1, wherein the communications circuitry is configured to exchange the test data with the remote device during setup operations for the network camera and/or periodically during operation of the network camera.

4. The network camera of claim 1, wherein the camera data comprises video data and video analytics data.

5. The network camera of claim 1, wherein the test data comprises first test data having a first size and second test data having a second size that is different from the first size.

6. The network camera of claim 1, wherein the data management settings include a number of channels, a resolution and a frame rate determined based on the available bandwidth.

7. A system comprising the network camera of claim 1 and the remote device.

8. The system of claim 7, further comprising an additional network camera communicatively coupled to the network, wherein the remote device is configured to receive additional camera data from the additional network camera based on the available bandwidth.

9. The system of claim 7, wherein the network camera is configured to:
   determine the available bandwidth in response to the exchange of the test data; and
   determine the data management settings based on the determined available bandwidth.

10. The system of claim 7, wherein the remote device is configured to:
    determine the available bandwidth in response to the exchange of the test data; and
    determine the data management settings based on the determined available bandwidth.

11. The system of claim 7, further comprising a user device communicatively coupled to the network, wherein the user device is configured to provide a user with one or more data management options for managing transmission of the camera data from the network camera to the remote device, and wherein the one or more data management options depend on the available bandwidth.

12. The system of claim 11, wherein the user device is further configured to provide a virtual customization button to the user that, when selected, provides the user with the ability to select a customized set of data management settings for managing the transmission of the camera data from the network camera to the remote device based on the available bandwidth.

13. The network camera of claim 1, wherein the communications circuitry is configured to provide the camera data based on camera system properties associated with additional network cameras, and user data preferences of a user of the additional network cameras.

14. A method, comprising:
sending test data via a network from a network camera to a remote device;
receiving, by the network camera, information via the network from the remote device;
determining an available bandwidth of the network to be used for camera operations for the network camera based on the information;
determining camera system properties associated with the network camera;
determining user preferences of a user of the network camera;
providing data management options to the user, wherein each of the data management options includes a package of available data management settings determined based on the available bandwidth determined for the network camera, the camera system properties, and the user preferences.

15. The method of claim 14, further comprising:
determining data management settings, for managing video data from the network camera, based at least in part on the available bandwidth determined for the network camera; and
providing the video data from the network camera to the remote device according to the data management settings.

16. The method of claim 15, further comprising storing the video data at the remote device, wherein the determining of the data management settings comprises setting data transmission parameters for the network camera with the remote device.

17. The method of claim 15, wherein the data management settings comprise at least a resolution, a frame rate, and a number of video channels to be transmitted from the network camera to the remote device.

18. The method of claim 14, further comprising
receiving, from the user, a selected one of the data management options containing data management settings.

19. The method of claim 15, further comprising:
providing, via the network, the video data from the network camera to the remote device using network data parameters;
determining a change in the available bandwidth while providing the video data; and
changing at least some of the network data parameters responsive to the determining of the change.

20. The method of claim 19, wherein the remote device comprises a cloud computing system, a user device, a digital video recorder or a network video recorder, wherein the network data parameters comprise a video resolution, a video frame rate, and a number of transmission channels, and wherein the changing comprises changing the video resolution, the video frame rate, and/or the number of transmission channels.

* * * * *